(12) United States Patent
Rindels

(10) Patent No.: US 7,841,375 B2
(45) Date of Patent: Nov. 30, 2010

(54) TOW CATCH FOR FIBER PLACEMENT HEAD

(75) Inventor: Chris Rindels, Rockford, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 530 days.

(21) Appl. No.: 11/774,870

(22) Filed: Jul. 9, 2007

(65) Prior Publication Data

US 2008/0006017 A1 Jan. 10, 2008

Related U.S. Application Data

(60) Provisional application No. 60/819,677, filed on Jul. 10, 2006.

(51) Int. Cl.
*B29C 65/00* (2006.01)

(52) U.S. Cl. ...................................... 156/522

(58) Field of Classification Search ................ 156/486, 156/367, 468, 522, 570, 577, 265, 270
See application file for complete search history.

(56) References Cited

U.S. PATENT DOCUMENTS

| | | | |
|---|---|---|---|
| 2,924,444 A * | 2/1960 | Greenberger | ............... 177/146 |
| 3,119,212 A * | 1/1964 | Zytka et al. | ................... 53/429 |
| 4,477,304 A | 10/1984 | Westermann | |
| 4,526,095 A * | 7/1985 | Rewitzer | ...................... 100/39 |
| 5,074,101 A * | 12/1991 | Rewitzer | ...................... 53/436 |
| 5,651,165 A * | 7/1997 | Mohr et al. | ............... 19/159 R |
| 5,700,347 A | 12/1997 | McCowin | |
| 2005/0109451 A1 | 5/2005 | Hauber et al. | |

FOREIGN PATENT DOCUMENTS

EP 0 154 321 A1 11/1985

OTHER PUBLICATIONS

Russell Devlieg et al., High-Speed Fiber Placement on Large Complex Structures, paper, 2007, 5 pages, 2007-01-3843.

* cited by examiner

*Primary Examiner*—Emmanuel M Marcelo
(74) *Attorney, Agent, or Firm*—Reinhart Boerner Van Deuren P.C.

(57) ABSTRACT

An apparatus and method are provided, for selectively clamping a fiber tow against a support in a fiber placement head, in a manner allowing one-way motion of the tow in a forward direction from an input side to an output side of the support, and precluding motion of the tow in a reverse direction from the output side to the input side of the support, through use of a tow catch apparatus mounted on the fiber placement head, at a position along the forward path of the tow before the shears and clamps of a cut/add mechanism.

27 Claims, 7 Drawing Sheets

TOW CATCH FOR FIBER PLACEMENT HEAD

CROSS-REFERENCE TO RELATED PATENT APPLICATIONS

This patent application claims the benefit of U.S. Provisional Patent Application No. 60/819,677, filed Jul. 10, 2006, the disclosure and teachings of which are incorporated herein in their entireties, by reference.

FIELD OF THE INVENTION

This invention relates to automated fiber placement machines, and more particularly to a method and apparatus for precluding withdrawal of a fiber tow away from a fiber placement head, in the event of breakage of the tow and/or failure of a tow clamping mechanism to hold the tow in place after the tow is cut during a cut/add operation.

BACKGROUND OF THE INVENTION

During automated fiber placement, a number of tows, or tapes, of fiber are typically fed in parallel fashion, as a band of tows, through a fiber placement head to a compaction roller which places the tows onto the surface of a tool. Each individual tow or tape is supplied from a spool, which is typically located in a stationary creel. The fiber placement head is typically movable, by an automatic controller, to orient the compaction roller properly for placing the band of tows onto the tool surface. Because the fiber placement head may move a considerable distance, in multiple directions, with respect to the creel, each of the fiber tows or tapes is typically routed through a number of redirects in traversing the distance between the creel and the head.

For various reasons, including preventing droop and tangling of the individual plys during certain motions of the fiber placement head, each fiber tow or tape is typically held in tension, between the creel and the fiber placement head. Tensioners inside the creel are often used for creating this tension.

During the automated fiber placement process, it is sometimes necessary to cut some of the tows to create openings for holes, windows, or other features in the part being constructed, or to narrow the band of tows that are being simultaneously laid down in parallel onto the tool surface. Conversely, tows may later be added back into the band of tows being laid down, when a wider band is desired.

In order to allow for the addition and cutting of tows, during the automated fiber placement process, fiber placement heads typically include various mechanisms for cutting and/or adding a tow. These mechanisms typically include a pinch cylinder, or other clamping mechanism, for holding the cut tow, or a tow not yet added to the band, in place at the fiber placement head, against the tension applied to the tow, so that the tow being held is not retracted away from the fiber placement head.

In the event that the pinch cylinder or tow clamping mechanism should fail, however, or a tow should break between the pinch cylinder and the creel, the tension on the tow will tend to draw the tow back toward the creel. This is an undesirable occurrence, because rethreading the tow through all of the redirects and feeding it back to the fiber placement head can be a complex and time-consuming process, during which the automated fiber placement operation must be shut down.

It is desirable, therefore, to provide an improved method and apparatus for holding a tow in place at the fiber placement head in the event of a malfunction of a pinch cylinder or breakage of the tow between the pinch cylinder and the creel.

BRIEF SUMMARY OF THE INVENTION

The invention provides an improved apparatus and method for selectively clamping a fiber tow against a support of a fiber placement head, in a manner allowing one-way motion of the tow in a forward direction from an input side to an output side of the support, and precluding motion of the tow in a reverse direction from the output side to the input side of the support, through use of a tow catch apparatus mounted on the fiber placement head, at a position along the forward path of the tow before the shears and clamps of a cut/add mechanism.

In one form of the invention, a tow catch, for selectively clamping a fiber tow against a support, in a manner allowing one-way motion of the tow in a forward direction from an input side to an output side of the support, and precluding motion of the tow in a reverse direction from the output side to the input side of the support, includes an arm, adapted for pivotable motion about a pivot point disposed at a minimum distance from the support, and terminating in a distal end of the tow catch disposed at a distance greater than the minimum distance from the support. The distal end of the arm is adapted for resting against the tow on the output side of the support. By virtue of this arrangement, motion of the tow in the reverse direction urges the arm to pivot in the reverse direction about the pivot point, in such a manner that the distal end of the arm clamps the tow between the distal end of the arm and the support. Conversely, motion of the tow in the forward direction, causes the pivot arm to pivot in a forward direction about the pivot point in such a manner that the distal end of the arm does not clamp the tow against the support.

In some forms of the invention, the distal end of the arm may be roughened, by a process such as knurling or grooving, or the distal end of either or both of the arm and the support may be conformable, for example, to thereby facilitate clamping of the tow between the distal end of the arm and the support. In some forms of the invention, the support may be adjustably positionable with respect to the pivot point. In some forms of the invention, the support may be defined by an outer periphery of a guide wheel mounted for rotation in at least a forward direction about a guide wheel axis which is offset from and extends substantially perpendicular to the forward direction of travel of the tow. The guide wheel axis may be adjustably positionable with respect to the pivot point, in some forms of the invention.

A tow catch, according to the invention, may further include a spring, operatively connected between the pivot point and the arm for urging the arm to pivot about the pivot point in the reverse direction. The spring may be selectively adjustable to provide a variable spring force acting on the arm for urging the arm to pivot about the pivot point in the reverse direction.

The arm of a tow catch, according to the invention, may also include a manual release lever, extending from the arm and adapted for application of a force thereto for pivoting the arm in a forward direction about the pivot point, to thereby lift the distal end of the arm away from the support.

A tow catch, according to the invention, may further include a roller, rotatably attached to the arm by a one-way clutch, and having an outer periphery thereof which defines the distal end of the arm and/or tow catch and is adapted for contact with the tow. The one-way clutch is configured and oriented to allow rotation of the roller by the tow when the tow is urged toward the forward direction, and to not allow rotation of the roller by the tow when the tow is urged toward the reverse direction.

A tow catch, according to the invention, may also include a stop, for limiting pivoting motion of the arm about the pivot point.

The invention may also take the form of a tow catch apparatus, including a tow catch module having a plurality of tow catches embodying some or all of the elements and functions of a tow catch, according to the invention, described above. A tow catch module, of a tow catch apparatus, according to the invention may also include a pivot bar defining the pivot point, with the plurality of tow catches of the tow catch module being pivotably mounted to the pivot bar. The tow catch module may further include a stop bar for limiting pivoting motion of the arm about the pivot point. The module may yet further include a tow catch module frame operatively connecting the pivot and stop bars in such a manner that the tow catch module can be operatively attached to or removed, as a module, from a fiber placement head.

In a tow catch module, according to the invention, the springs for each of the tow catch arms may be operatively attached between the tow catch module frame and its respective tow catch arm. At least one of the springs may be selectively individually adjustable to provide a variable spring force acting on its respective arm, for urging the respective arm to pivot about the pivot point in the reverse direction.

A tow catch apparatus, according to the invention, may further include the support, and a support frame adapted for attachment to the fiber placement head, and further adapted for attachment thereto of a tow catch module, according to the invention, and the support. In some forms of a tow catch apparatus, according to the invention, the support is common to all of the tow catches of the tow catch module, and is adjustably positionable with respect to the pivot point. In some forms of the invention, the support may be defined by the outer peripheries of a plurality of guide wheels, one for each tow catch of the plurality of tow catches in the tow catch module, with all of the guide wheels being operatively mounted for rotation in at least the forward direction of their respective tow about a common guide wheel axis offset from and extending substantially perpendicular to the forward direction of travel of the tows. The common guide wheel axis may be adjustably positional with respect to the pivot point.

The invention may also take the form of a fiber placement head, including a tow catch, tow catch apparatus, and/or tow catch module, according to the invention. The invention may also take the form of an automated fiber placement machine, including a tow catch, tow catch apparatus and/or tow catch module, according to the invention, attached to a fiber placement head of the fiber placement machine.

The invention may also take the form of a method for allowing one-way motion of a tow in a forward direction from an input side to an output side of a support, and for precluding motion of the tow in a reverse direction from the output side to the input side of the support, in a fiber placement head, and/or a fiber placement machine. A method, according to the invention, may include the step of selectively clamping a fiber tow against the support with a tow catch, according to the invention.

Other aspects, objects and advantages of the invention will be apparent from the following detailed description of exemplary embodiments of the invention, taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
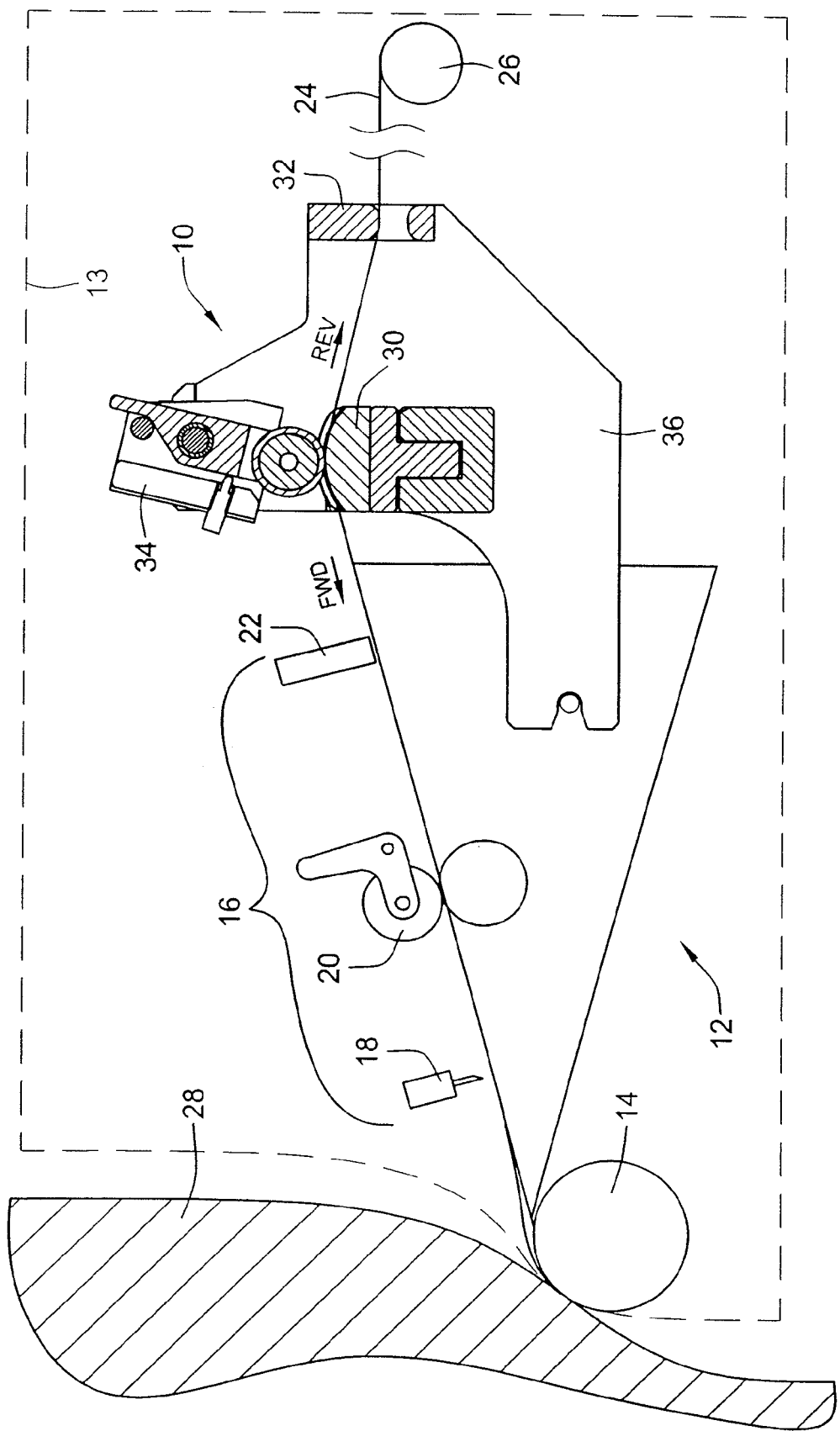
FIG. 1 is a schematic illustration of a first exemplary embodiment of an automated fiber placement machine having a tow catch mechanism, according to the invention, attached to a fiber placement head of the automated fiber placement machine.

FIG. 1 shows a first exemplary embodiment of a tow catch apparatus 10, according to the invention, attached to a fiber placement head 12, of an automated fiber placement machine 13. The fiber placement head 12 includes a compaction roller 14, and a cut/add mechanism 16, with the cut/add mechanism 16 including a tow cutter 18, feed roller mechanism 20, and a tow clamp mechanism 22.

As illustrated in FIG. 1, each individual tow 24, is fed from a separate reel 26 of fiber material, located within a creel (not shown) of the fiber placement machine 13. The creel also includes a reel tensioner (not shown) operatively attached to the reel 26 for applying a tensile force to the tow 24.

From the reel 26, the tow 24 is fed through the tow catch apparatus 10 attached to the head 12, to be pressed into place on the surface of a tool 28 by the compaction roller 14. From FIG. 1, it will be noted that the tow catch apparatus 10 is disposed between the tow clamp mechanism 22 and the reel 26 along the path taken by the tow 24 between the reel 26 and the compaction roller 14.

Figure 2:
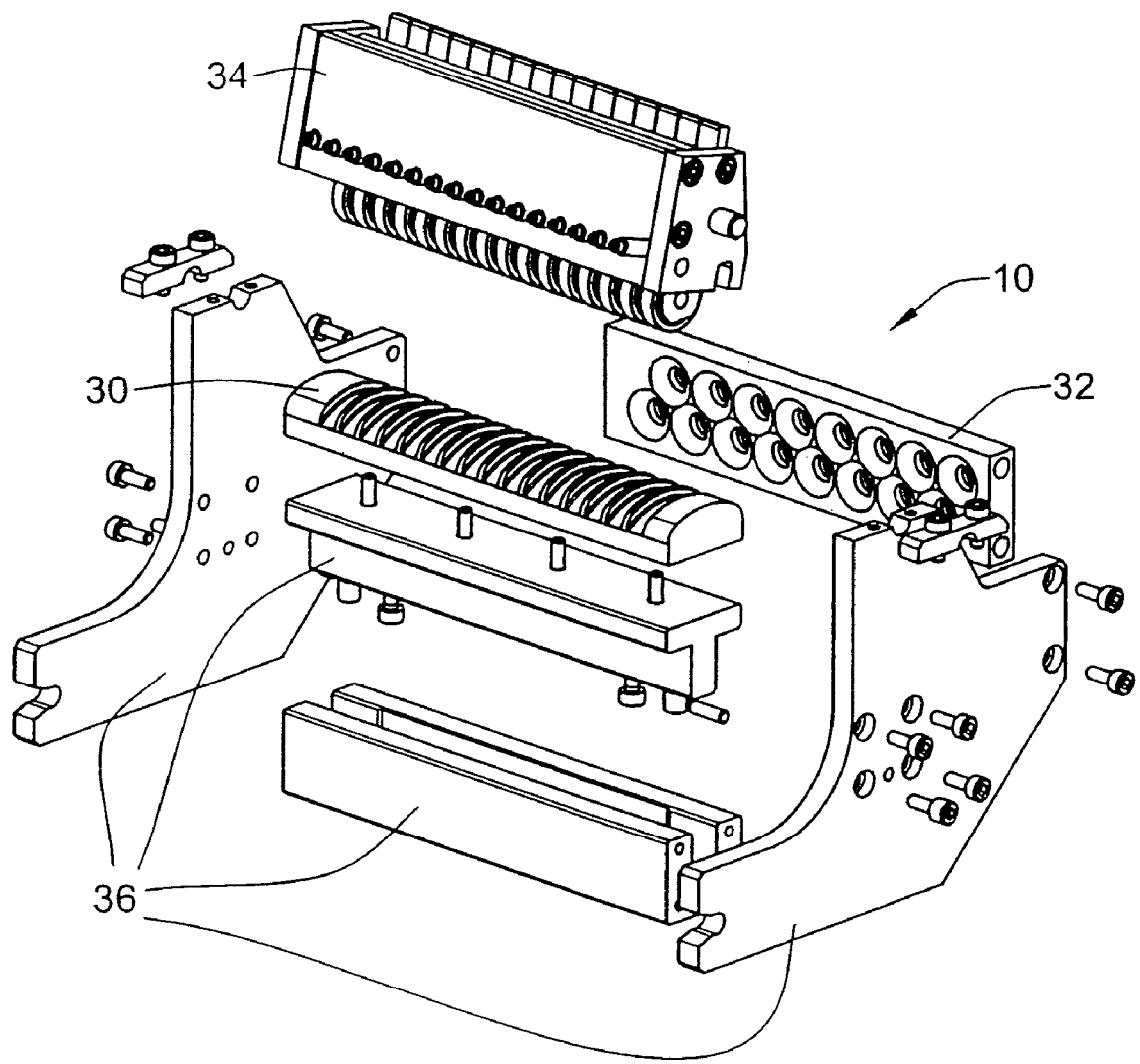
FIG. 2 is a partially exploded perspective illustration of an exemplary embodiment of a tow catch apparatus, of the first exemplary embodiment of the automated fiber placement machine shown in FIG. 1.

As shown in FIGS. 1 and 2, the exemplary embodiment of the tow catch apparatus 10 includes a tow support 30, a tow guide 32 and a tow catch module 34 operatively connected together by a support frame 36, which is adapted for attachment to the fiber placement head 12 in the manner illustrated in FIG. 1. In the embodiment illustrated in FIG. 2, the tow support 30 is attached to the support frame by a series of adjustment screws, and may also include other appropriate positioning mechanisms such as shims, for example, to operatively attach the support 30 in such a manner that it may be adjusted positionally with respect to the pivot point 46 (see FIG. 3) facilitate achieving a proper working positional relationship between various elements of the tow catch apparatus, in a manner described in more detail below with regard to FIGS. 3-5.

Figure 3:
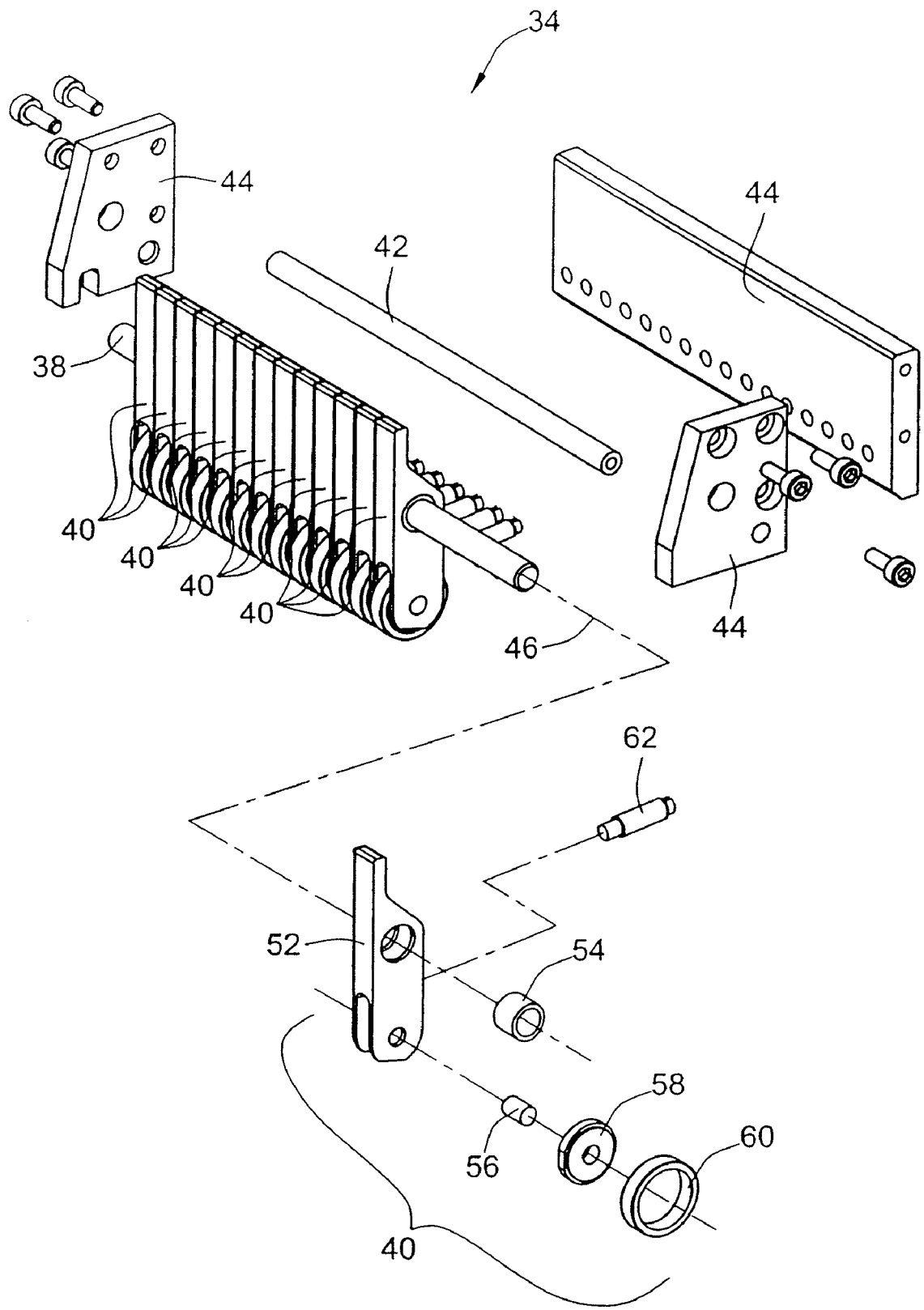
FIG. 3 is a partially exploded perspective illustration of an exemplary embodiment of a tow catch module, according to the invention, of the exemplary embodiments of the tow catch apparatus and automated fiber placement machine shown in FIGS. 1 and 2.

FIG. 3 is an exploded view of the exemplary embodiment of the tow catch module 34. The tow catch module 34 includes a pivot bar 38, a plurality of tow catches 40, a stop bar 42, and a tow catch module frame 44 which operatively connects the pivot and stop bars 38, 42 in such a manner that the tow catch module 34 can be operatively attached to and/or removed, as a module from the support frame 36 of the tow catch apparatus 10.

As further illustrated in FIG. 3, the center line of the pivot bar 38 defines a pivot point 46, about which the individual tow catches 40 are mounted in the manner described below.

Figure 4:
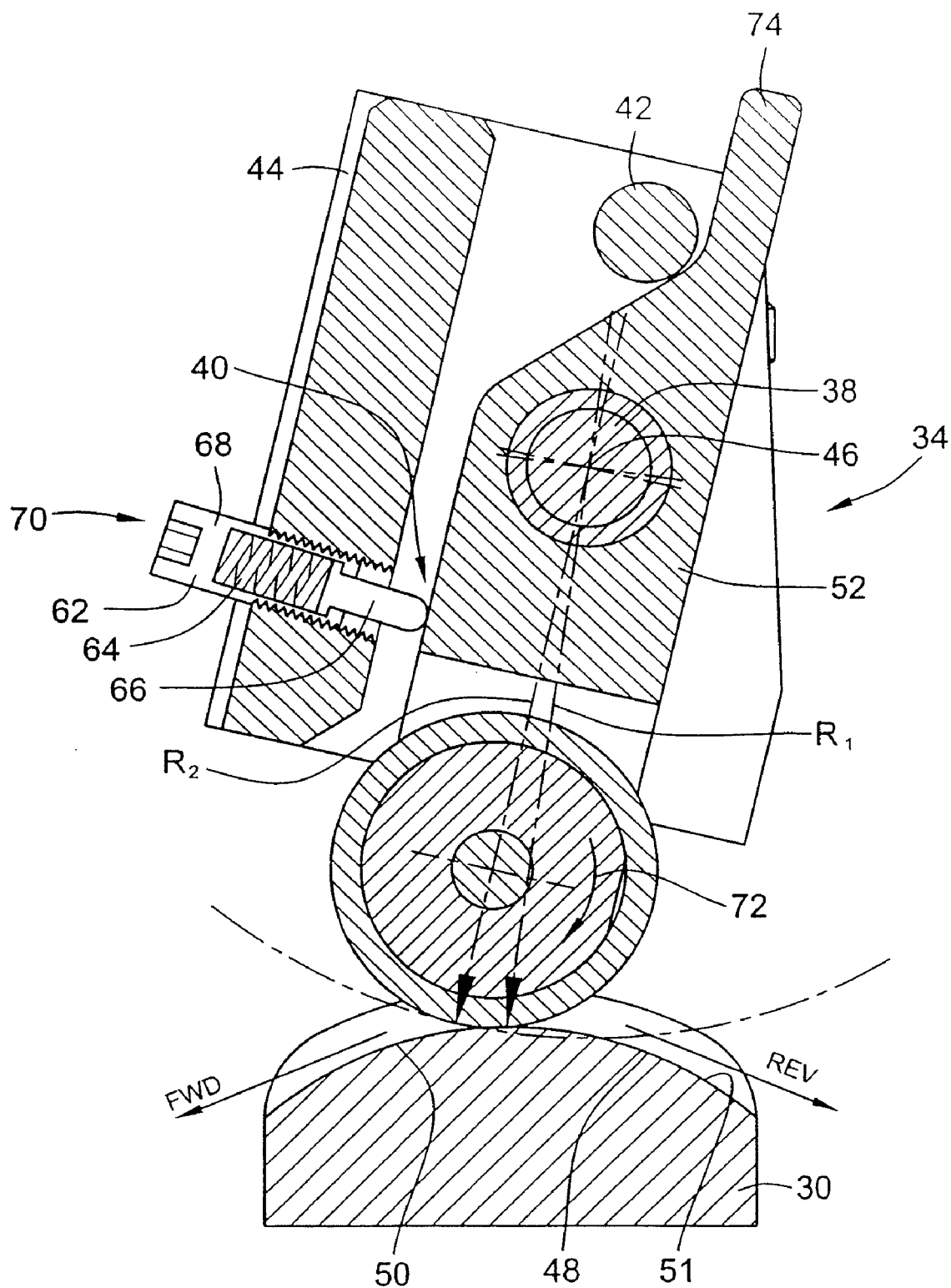
FIG. 4 is an enlarged, orthographic, cross-sectional view of a portion of the exemplary embodiment of the tow catch apparatus shown in FIG. 3, with a tow catch, of the tow catch apparatus, positioned for clamping a tow against a support, for precluding motion of the tow in a reverse direction across the support.

As shown in FIGS. 1, 3 and 4, each of the tow catches 40 is configured for selectively clamping a respective fiber tow 24 against the support 30, in a manner allowing one-way motion of the tow 24 in a forward direction from an input side 48 to an output side 50 of the support 30, and precluding motion of the tow 24 in the reverse direction from the output side 50 to the input side 48 of the support 30. Stated another way, the input side 48 of the support 30 is located closest to the reel 26, and the output side of the support 30 is located closest to the compression roller 14, along a faying surface 51 between the tow 24 and the support 30. The forward direction of motion of the tow 24 is from the reel 26 to the compression roller 14, and conversely the reverse direction of motion of the tow 24 is from the compression roller 14 to the reel 26.

Figure 5:
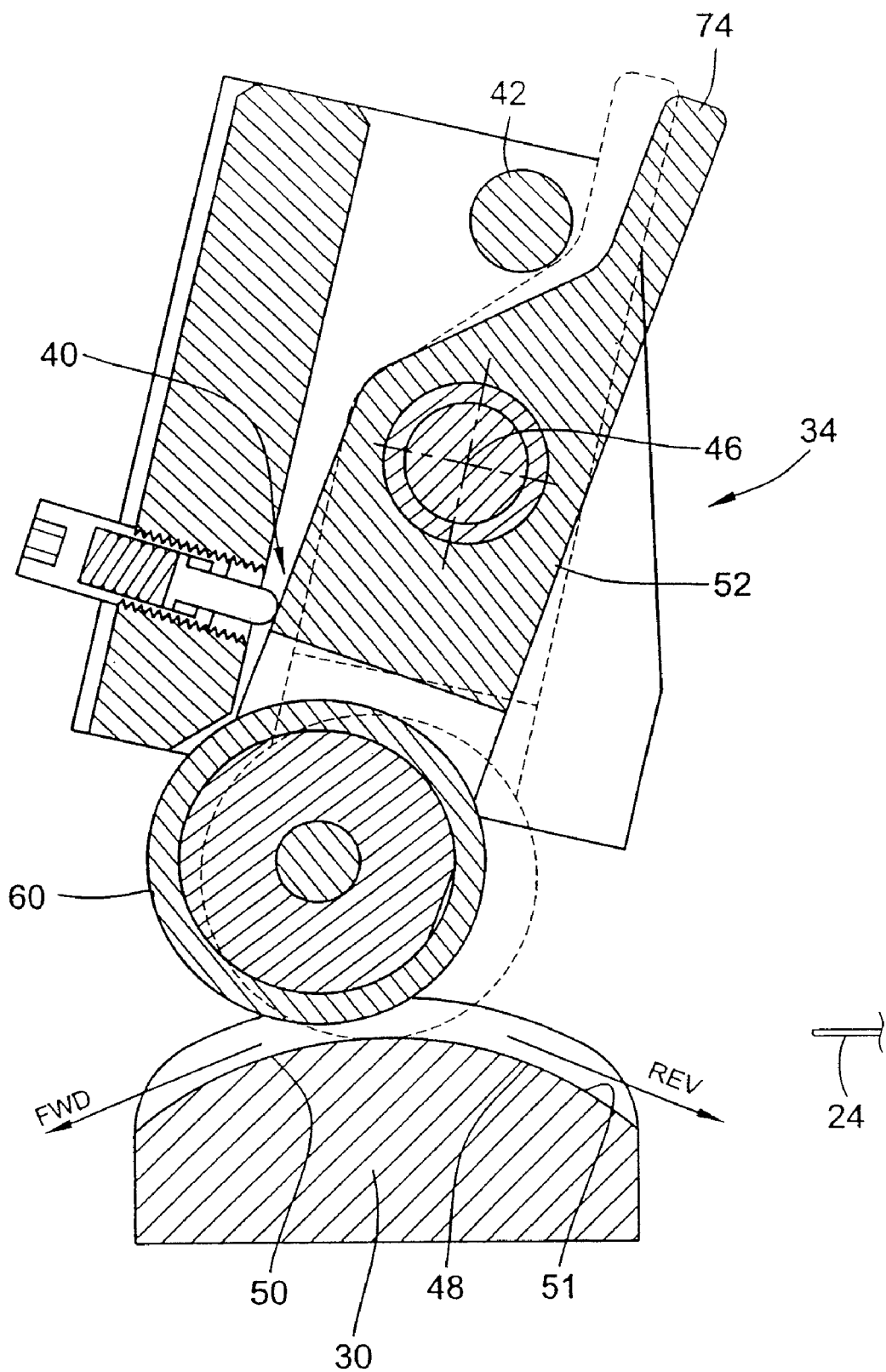
FIG. 5 is an enlarged, cross-sectional, orthographic illustration of the portion of the exemplary embodiment of the tow catch apparatus shown in FIG. 4, with the tow catch positioned, by virtue of a manual release lever, to allow motion of a tow in either a forward or a reverse direction across a support.

As best seen in FIGS. 3, 4 and 5, the tow catches 40, of the exemplary embodiment, each include an arm 52, a bushing 54, an axle 56, a one-way clutch 58, a roller 60, and an adjustable spring cartridge 62. The arm 52 is pivotably mounted by the bushing 54 on the pivot bar 38, so that the tow catch can pivot about the pivot point 46. The roller 60 is mounted to the arm 52 by the one-way clutch 58 and axle 56, in such a manner that the outer periphery of the roller 60 defines a distal end of both the arm 52 and the tow catch 40, with the roller 60 being adapted for resting against the tow 24, when the tow 24 is present, or against the faying surface 51 when the tow 24 is not present.

As shown in FIG. 4, the pivot point 46 is disposed at a minimum distance R1 from the faying surface 51 of the support 30, and the various components of the tow catch 40 are configured in such a manner that at least a portion of the distal end of the tow catch 40 (i.e. the periphery of the roller 60) is disposed at a distance R2 which is greater than the minimum distance R1 between the pivot point 46 and the support 30. By virtue of the differences in the distances R1 and R2, it will be seen that the distal end of the tow catch 40 cannot move from the forward to the reverse side 50, 48 of the support 30, because the tow catch 40 is too long to allow such motion to occur. Those having skill in the art will recognize that this would be true even if the support 30 did not have a curved faying surface 51, as does the support 30 in the exemplary embodiment of the invention.

When the tow catch 40 is installed, the various components of the exemplary embodiment of the invention cause the distal end of the tow catch 40 to be positioned along the output side 50 of the support 30, such that motion of the tow 24 in a reverse direction would urge the arm 52 to pivot in the reverse direction in such a manner that the distal end of the arm 52, formed by the outer periphery of the roller 60, clamps the tow 24 between the distal end of the tow catch 40 and the support 30. Conversely, motion of the tow 24 in the forward direction, causes the arm 52 to pivot in the forward direction, in such a manner that the distal end of the tow catch 40 does not clamp the tow 24 against the support 30. In some forms of the invention, it may be advantageous to roughen the outer periphery of the roller 60, by knurling, for example, or to form the roller 60 and/or support 30 at least partially from a conformable material, to thereby facilitate clamping of the tow 24 between the distal end of the tow catch 40 and the support 30.

By virtue of the arrangement and configuration of the tow catch 40 components described above, therefore, the tow catch 40 functions to clamp the tow 24 against the support 30 to preclude having the tow 24 drawn away from the head 12 and back toward the reel 26 only when the tow 24 is not being fed in the forward direction, or being clamped in a stationary position with respect to the head 12 by the clamp mechanism 22.

As shown in FIG. 4, the adjustable spring cartridge 62, of the exemplary embodiment includes a helical compression spring 64 and a movable plunger 66 located within the bore of a threaded housing 68, having a hex recess therein for moving the threaded housing in and out of a threaded hole in a portion of the tow catch module frame 44. An exposed end of the plunger 66 bears against the arm 52 of the tow catch 40 in a manner urging the arm 52 to pivot about the pivot point 46 in the reverse direction, such that the distal end of the tow catch 40 is urged toward a position of contact with the output side 50 of the support 30. The spring force applied to the arm 52 may be varied by threading the housing 68, of the adjustable spring cartridge 62, in toward, or away from, the arm 52.

FIG. 4 illustrates the tow catch 40 in a clamped position, wherein a tow 24 extending across the support 30 would be clamped against the faying surface 51 of the support 30 by the distal end of the tow clamp 40. When a tow 24 is moving in the forward direction, past the tow catch 40, the distal end of the tow catch 40 will swing slightly away from the output side 50 of the support 30, against the force exerted by the spring 64, to thereby allow free motion of the tow 24 in the forward direction. The one-way clutch 58 is also configured and mounted in such a manner that the roller 60 may only rotate when the tow 24 is moving in the forward direction, as indicated by the arrow 72 in FIG. 4. By virtue of this arrangement, forward motion of the tow 24 proceeds essentially unhampered by the presence of the tow catch 40. Should the tow 24 attempt to move in the reverse direction, however, the one-way clutch 58 will stop rotation of the roller 60, and the contact between the tow 24 and the outer periphery of the roller 60 will cause the distal end of the tow catch 40 to move in the reverse direction and clamp the tow 24 between the outer periphery of the roller 60 and the support 30.

As shown in FIG. 5, the arm 52 of the exemplary embodiment of the tow catch 40, has an end thereof, extending oppositely from the roller 60, configured and positioned to form a manual release lever 74. By virtue of its oppositely directed extension, with respect to the roller 60 about the pivot point 46, when the manual release lever 74 is pushed toward the reverse direction, the roller 60 of the tow catch 40 is lifted out of contact with the support 30, so that a tow 24 may be conveniently threaded through, between the roller 60 and the support 30, and/or be released from the tow catch 40.

As will be appreciated, from a comparative examination of FIGS. 4 and 5, the stop bar 42, of the exemplary embodiment of the tow catch module 34 is positioned in such a manner that it will align all of the tow catches 40 in a manner allowing the tow catch module 34 to be readily positioned on the output side 50 of the support 30 during installation of the tow catch module 34 into the support frame 36.

Those having skill in the art will recognize that, although the distal end of the tow catch 40, of the exemplary embodiment described herein, was formed by the outer periphery of the roller 60, in other embodiments of the invention the distal end of the arm 52 may include other arrangements for forming the distal end of the tow catch 40, which do not include the roller 60 and its associated one-way clutch 58 and axle 56. For example, the distal end of the tow catch arm 52 could include a non-rotatable end surface adapted for directly contacting the tow 24. In some embodiments of the invention, it may be desirable to use a roller, directly connected to the arm of the tow catch, through a conventional axle, without inclusion of the one-way clutch 58 of the exemplary embodiment of the tow catch 40 disclosed herein. It may also be desirable, in some embodiments of the invention, to eliminate the adjustable spring cartridge, used in the exemplary embodiment, and utilize instead another form of spring, such as a torsion spring, or simply to eliminate the spring function all together.

It is also noted, that although the exemplary embodiments of the invention disclosed herein, are essentially passive mechanical arrangements including a tow catch, according to the invention, there is no intent to limit application of a tow catch, according to the invention, to only those embodiments which are passively actuated. In other embodiments of the invention, it may be desirable to provide some form of pneumatic, electrical, or other active actuation systems for operating a tow catch, according to the invention, in one or more of its modes of operation.

Figure 6:
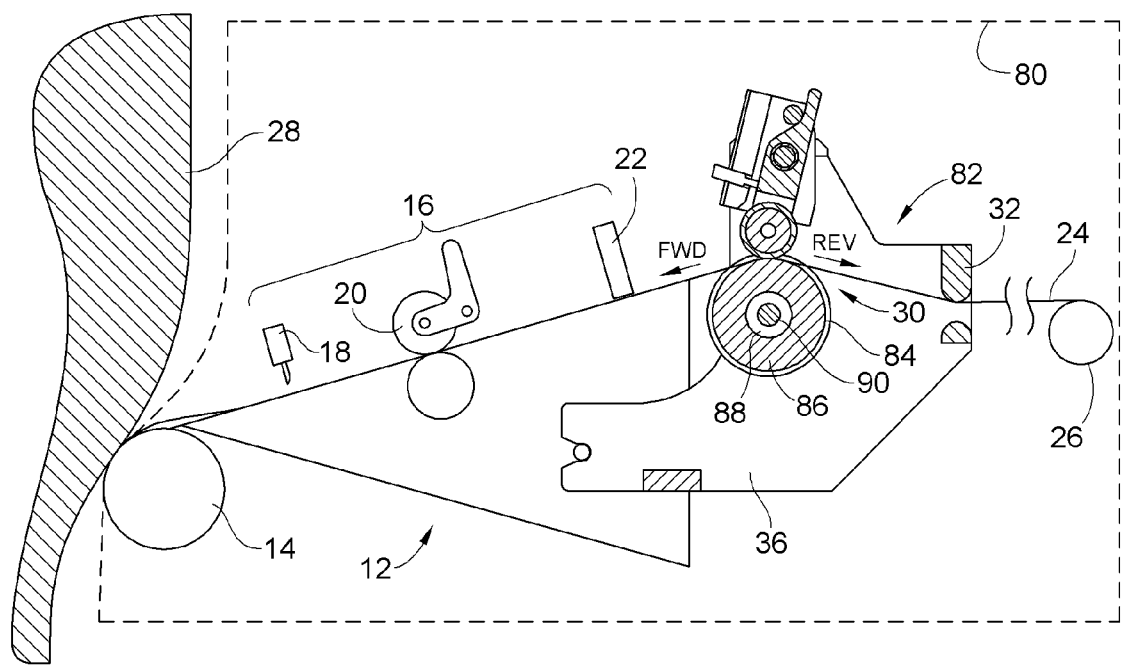
FIG. 6 is a schematic illustration of a second exemplary embodiment of an automated fiber placement machine having a tow catch mechanism, according to the invention, attached to a fiber placement head of the automated fiber placement machine, in which a support for the tows is provided by a plurality of support wheels rather than a support bar as shown in FIGS. 1 and 2 in relation to the first exemplary embodiment.
Figure 7:
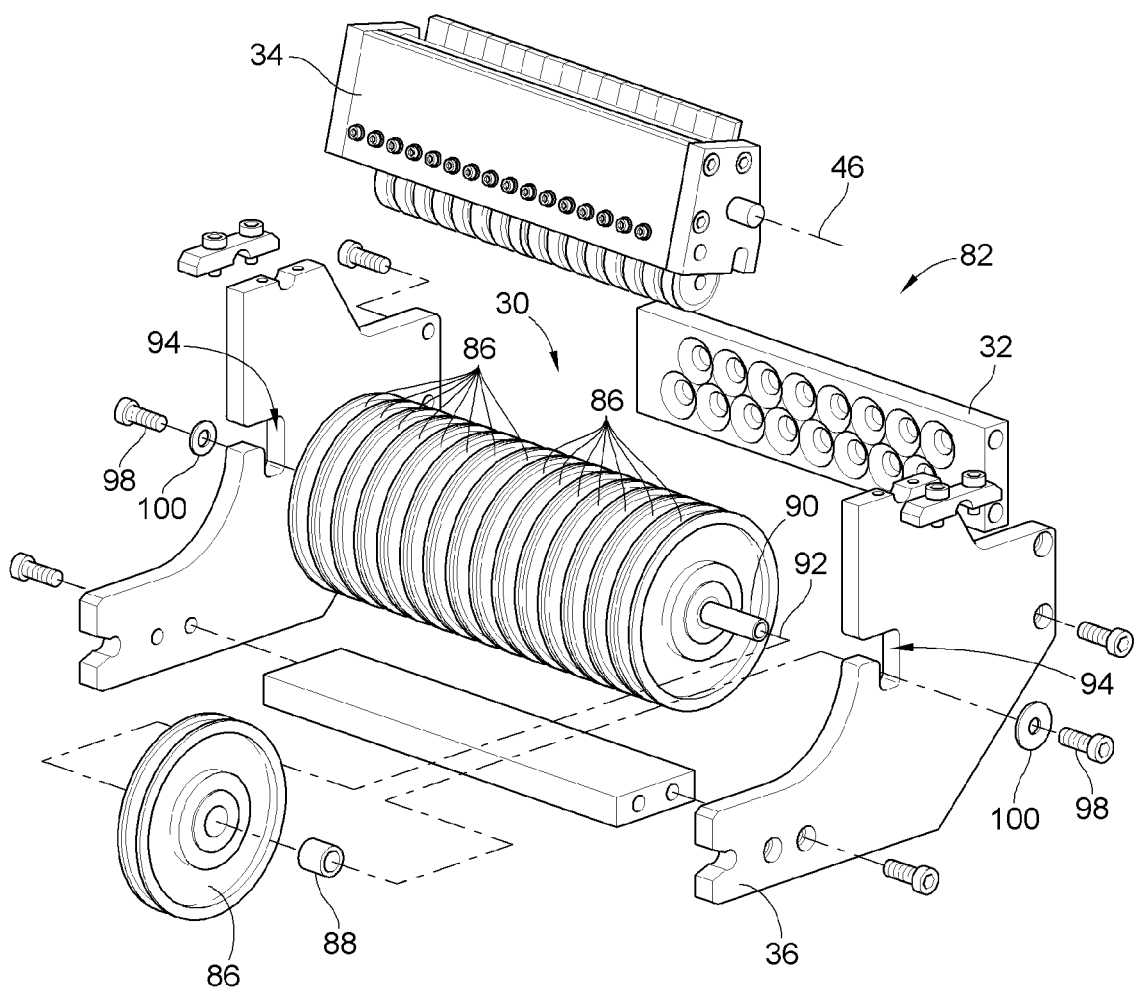
FIG. 7 is a partially exploded perspective illustration of an exemplary embodiment of a tow catch apparatus, of the second exemplary embodiment of the automated fiber placement machine shown in FIG. 6.

FIGS. 6 and 7 illustrate a second exemplary embodiment of an automated fiber placement machine 80, which is substantially identical to the first exemplary embodiment of the automated fiber placement machine 13, described hereinabove with reference to FIGS. 1-5, with the exception that the second exemplary embodiment of the automated fiber placement machine 80 includes an alternate exemplary embodiment of a tow catch apparatus 82 according to the invention. For sake of clarity and facilitating understanding of the second exemplary embodiment 80 of the invention, like reference numerals are utilized wherever appropriate in FIGS. 6 and 7, as compared to FIGS. 1-5.

In the second exemplary embodiment of the tow catch apparatus 82, the support 30 is formed by the outer peripheries 84 of a plurality of flanged support wheels 86 which are individually rotatably mounted by bushings 88 on a common axle 90 for rotation about a common support wheel axis 92. The opposite axial ends of the axle 90 are mounted within a pair of slots 94, 96 in the frame 36. The ends of the axle 90 are secured within the slots 94, 96 by bolts 98 and washers 100 in such a manner that the flanged support wheels 86 may be adjustably positioned with respect to the pivot point 46, to achieve proper alignment and positioning of the flanged wheels 86 with respect to the rollers 60 at the ends of the arms 52, so that the distal ends of the arms 52, formed by the outer periphery of the rollers 60, clamp the tows 24 between the distal ends of the tow catches 40 and the outer periphery 84 of the flanged support wheels 86 in the same manner as described above for clamping the tows 24 against the support 30 in the first exemplary embodiment of the tow catch apparatus 10 with reference to FIGS. 4 and 5.

Although not specifically illustrated in the drawings, in some forms of the invention it may be advantageous to form the flanged support wheels at least partially from a conformable material to facilitate clamping of the tow 24 against the outer periphery 84 of the flanged wheels.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context.

What is claimed is:

1. A tow catch, for selectively clamping a fiber tow against a support in a manner allowing one-way motion of the tow in a forward direction from an input side to an output side of the support and precluding motion of the tow in a reverse direction from the output side to the input side of the support, the tow catch comprising:
   an arm, adapted for pivotable motion about a pivot point disposed at a minimum distance from the support, and terminating in a distal end of the arm disposed at a distance greater than the minimum distance from the support;
   the distal end of the arm being adapted for resting against the tow on the output side of the support during motion of the tow in both the forward direction and the reverse direction;
   whereby motion of the tow in the reverse direction urges the arm to pivot in the reverse direction in such a manner that the distal end of the arm clamps the tow between the distal end of the arm and the support, and motion of the tow in the forward direction causes the arm to pivot in the forward direction in such a manner that the distal end of the arm does not clamp the tow against the support.

2. The tow catch of claim 1, further comprising, a spring, operatively connected between the pivot point and the arm for urging the arm to pivot about the pivot point in the reverse direction.

3. The tow catch of claim 2, wherein, the spring is selectively adjustable to provide a variable spring force acting on the arm for urging the arm to pivot about the pivot point in the reverse direction.

4. The tow catch of claim 1, wherein, the arm includes a manual release lever extending therefrom and adapted for application of force thereto for pivoting the arm in the forward direction about the pivot point, to thereby lift the distal end of the arm away from the support.

5. The tow catch of claim 1, further comprising:
a roller, rotatably attached to the arm with a one-way clutch, and having an outer periphery thereof defining the distal end of the arm and adapted for contact with the tow;
the one-way clutch being configured and oriented to allow rotation of the roller by the tow when the tow is urged toward the forward direction, and to not allow rotation of the roller by the tow when the tow is urged toward the reverse direction.

6. The tow catch of claim 5, wherein, the outer periphery of the roller is roughened.

7. The tow catch of claim 5 wherein, at least one of the periphery of the roller and the support is conformable.

8. The tow catch of claim 1, further comprising, a stop, for limiting pivoting motion of the arm about the pivot point.

9. The tow catch of claim 1, wherein, the support is adjustably positionable with respect to the pivot point.

10. The tow catch of claim 1, wherein, the support is defined by an outer periphery of a guide wheel mounted for rotation in at least the forward direction about a guide wheel axis offset from and extending substantially perpendicular to the forward direction of travel of the tow.

11. The tow catch of claim 10, wherein, the guide wheel axis is adjustably positionable with respect to the pivot point.

12. A tow catch apparatus, for selectively clamping one or more fiber tow of a plurality of fiber tows against a support in a manner allowing one-way motion of the clamped tow or tows in a forward direction from an input side to an output side of the support and precluding motion of the clamped tow or tows in a reverse direction from the output side to the input side of the support, the tow catch apparatus comprising,
a tow catch module, including a plurality of tow catches, with each tow catch of the plurality corresponding to a given one of the plurality of tows and including some or all of the members of a group consisting of:
a) an arm, adapted for pivotable motion about a pivot point disposed at a minimum distance from the support, and terminating in a distal end of the arm disposed at a distance greater than the minimum distance from the support, with the distal end of the arm being adapted for resting against the tow on the output side of the support, such that motion of the tow in the reverse direction urges the arm to pivot in the reverse direction in such a manner that the distal end of the arm clamps the tow between the distal end of the arm and the support, and motion of the tow in the forward direction causes the arm to pivot in the forward direction in such a manner that the distal end of the arm does not clamp the tow against the support;
b) a spring, operatively connected between the pivot point and the arm for urging the arm to pivot about the pivot point in the reverse direction;
c) the spring being selectively adjustable to provide a variable spring force acting on the arm for urging the arm to pivot about the pivot point in the reverse direction;
d) the arm including a manual release lever extending therefrom and adapted for application of force thereto for pivoting the arm in the forward direction about the pivot point, to thereby lift the distal end of the arm away from the support;
e) a roller, rotatably attached to the arm with a one-way clutch, and having an outer periphery thereof defining the distal end of the arm and adapted for contact with the tow, with the one-way clutch being configured and oriented to allow rotation of the roller by the tow when the tow is urged toward the forward direction, and to not allow rotation of the roller by the tow when the tow is urged toward the reverse direction; and
f) a stop, for limiting pivoting motion of the arm about the pivot point.

13. The tow catch apparatus of claim 12, wherein, the support is common to all of the tow catches and is adjustably positionable with respect to the pivot point.

14. The tow catch of claim 13, wherein, the support is defined by the outer peripheries of a plurality of guide wheels, one for each tow catch of the plurality of tow catches, with all of the guide wheels being operatively mounted for rotation in at least the forward direction of their respective tow about a common guide wheel axis offset from and extending substantially perpendicular to the forward direction of travel of the tows.

15. The tow catch of claim 14, wherein, the common guide wheel axis is adjustably positionable with respect to the pivot point.

16. The tow catch apparatus of claim 12, wherein the tow catch module further comprises:
a pivot bar defining the pivot point, with the plurality of tow catches being pivotably mounted to the pivot bar;
a stop bar for limiting pivoting motion of the arm about the pivot point; and
a tow catch module frame operatively connecting the pivot and stop bars in such a manner that the tow catch module can be operatively attached to or removed, as a module, from a fiber placement head.

17. The tow catch apparatus of claim 12, wherein, each of the tow catch arms includes a spring and the spring for each of the tow catch arms is operatively attached between the tow catch module frame and its respective tow catch arm.

18. The tow catch apparatus of claim 17, wherein, at least one of the springs is selectively individually adjustable to provide a variable spring force acting on its respective arm for urging the respective arm to pivot about the pivot point in the reverse direction.

19. The tow catch apparatus of claim 12, further comprising:
the support; and
a support frame, adapted for attachment to a fiber placement head, and further adapted for attachment thereto of the tow catch module and the support.

20. The tow catch apparatus of claim 19, wherein, the support is common to all of the tow catches and is adjustably positionable with respect to the pivot point.

21. The tow catch of claim 20, wherein, the support is defined by an outer periphery of a plurality of guide wheels, one for each tow catch of the plurality of tow catches, with all of the guide wheels being operatively mounted for rotation in at least the forward direction of their respective tow about a common guide wheel axis offset from and extending substantially perpendicular to the forward direction of travel of the tows.

22. The tow catch of claim 21, wherein, the common guide wheel axis is adjustably positionable with respect to the pivot point.

23. A fiber placement head, comprising, a tow catch operatively attached thereto, the tow catch comprising:
 an arm, adapted for pivotable motion about a pivot point and terminating in a distal end of the arm;
 a roller rotatably attached to the distal end of the arm and positioned for resting against a tow on an output side of a support;
 whereby motion of the tow in a reverse direction urges the arm to pivot in the reverse direction in such a manner that the roller clamps the tow between the roller and the support, and motion of the tow in the forward direction causes the arm to pivot in the forward direction in such a manner that the roller does not clamp the tow against the support.

24. The fiber placement head of claim 23, wherein, the tow catch is configured for selectively clamping the tow against the support in a manner allowing one-way motion of the tow in the forward direction from an input side to an output side of the support and precluding motion of the tow in a reverse direction from the output side to the input side of the support.

25. A fiber placement machine, comprising a tow catch operatively attached thereto, the tow catch comprising:
 an arm, adapted for pivotable motion about a pivot point and terminating in a distal end of the arm;
 a roller, rotatably attached to the arm with a one-way clutch, and having an outer periphery thereof defining the distal end of the arm and adapted for contact with a tow the roller being adapted for resting against the tow on an output side of a support.

26. The fiber placement machine of claim 25, wherein, the tow catch is configured for selectively clamping a fiber tow against a support in a manner allowing one-way motion of the tow in a forward direction from an input side to an output side of the support and precluding motion of the tow in a reverse direction from the output side to the input side of the support.

27. A tow catch, for selectively clamping a fiber tow against a support in a manner allowing one-way motion of the tow in a forward direction from an input side to an output side of the support and precluding motion of the tow in a reverse direction from the output side to the input side of the support, the tow catch comprising:
 an arm, adapted for pivotable motion about a pivot point disposed at a minimum distance from the support, and terminating in a distal end of the arm disposed at a distance greater than the minimum distance from the support;
 the distal end of the arm being adapted for resting against the tow on the output side of the support;
 a roller, rotatably attached to the arm with a one-way clutch, and having an outer periphery thereof defining the distal end of the arm and adapted for contact with the tow;
 the one-way clutch being configured and oriented to allow rotation of the roller by the tow when the tow is urged toward the forward direction, and to not allow rotation of the roller by the tow when the tow is urged toward the reverse direction; and
 whereby motion of the tow in the reverse direction urges the arm to pivot in the reverse direction in such a manner that the distal end of the arm clamps the tow between the distal end of the arm and the support, and motion of the tow in the forward direction causes the arm to pivot in the forward direction in such a manner that the distal end of the arm does not clamp the tow against the support.

* * * * *